United States Patent [19]

Cain

[11] Patent Number: 5,448,631
[45] Date of Patent: Sep. 5, 1995

[54] APPARATUS FOR HANDLING FEATURES IN A TELEPHONE NETWORK

[75] Inventor: Michael E. Cain, Arvada, Colo.

[73] Assignee: U S West Advanced Technologies, Inc., Boulder, Colo.

[21] Appl. No.: 959,767

[22] Filed: Oct. 13, 1992

[51] Int. Cl.[6] .................. H04M 3/42; H04M 1/56
[52] U.S. Cl. .................. 379/201; 379/142; 379/207; 379/211; 379/215; 379/216
[58] Field of Search ............ 379/92, 201, 207, 215, 379/208, 209, 210, 211, 212, 213, 214, 216, 142

[56] References Cited

U.S. PATENT DOCUMENTS

| | | | |
|---|---|---|---|
| 4,261,052 | 4/1981 | Persson et al. | 370/59 |
| 4,674,115 | 6/1987 | Kaleita et al. | 379/201 |
| 4,677,663 | 6/1987 | Szlam | 379/211 |
| 4,695,977 | 9/1987 | Hansen et al. | 379/94 |
| 4,782,517 | 11/1988 | Bernardis et al. | 379/201 |
| 4,878,240 | 10/1989 | Lin et al. | 379/201 X |
| 5,337,351 | 8/1994 | Manabe et al. | 379/215 X |

Primary Examiner—James L. Dwyer
Assistant Examiner—Harry S. Hong
Attorney, Agent, or Firm—Brooks & Kushman

[57] ABSTRACT

A feature manager that handles the interactions between features in a telephone network is disclosed. A basic call processor transmits a sequence of event messages to the feature manager. The event messages are then transmitted from the feature manager to a subset of feature modules for processing. The feature modules, following receipt of an event message, each formulate a response message that is returned to the feature manager. The response messages contain information that instructs the basic call processor to act. Information contained within the response message is utilized to determine what other feature modules, if any, must be polled. The feature manager formulates a call processor response from the response messages received and returns the call processor response to the basic call processor. The call processor response includes information that instructs the basic call processor to act accordingly.

12 Claims, 6 Drawing Sheets

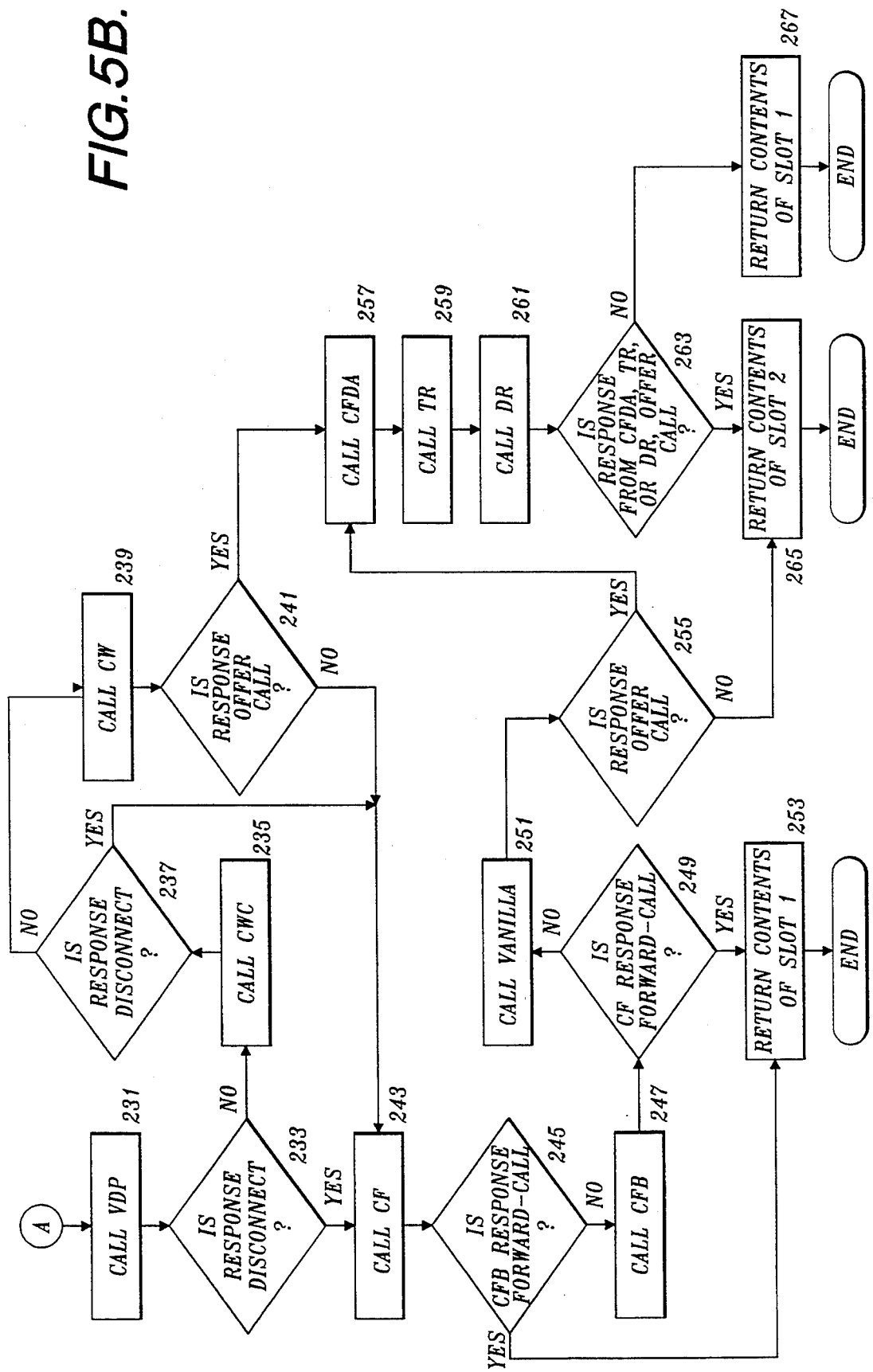

APPARATUS FOR HANDLING FEATURES IN A TELEPHONE NETWORK

TECHNICAL AREA OF THE INVENTION

The invention relates to the provision of call processing features and, more particularly, to an apparatus for managing the interactions between features in a telephone network.

BACKGROUND OF THE INVENTION

A call processing feature is a capability or service provided to the telephone customer by a public switched telephone network. Examples of some features are: 3-way calling, call waiting, call forwarding, toll-free 800 numbers, and emergency 911 access. In the current public switched telephone network (PSTN), the process of modifying an existing feature or introducing a new feature can be time consuming and costly. The PSTN includes a plurality of switches. As is known in the art, the switches control the routing and flow of telephone calls. The operation of modern switches is generally carried out by a switch software control package. The portion of the switch software control package that actually route and process calls is called the call processing software.

Likewise, features are now implemented as software at the switches of the PSTN and, in fact, are integrated into the switch control software package. The introduction of a new feature involves the production of detailed functional requirements of the feature along with specifications regarding how the feature should interact with other features already in existence. These requirements are made available to the manufacturers of telephone switches. The manufacturers then incorporate the new features as software in the switch control software package.

A feature interaction is the effect that one feature has upon another feature. For example, one common feature, emergency 911, has substantial effects on other features. If a telephone customer is engaged in an emergency 911 call, other features normally available to the customer are disabled. Even if the user subscribes to call waiting, the call waiting feature is disabled until the emergency 911 call is complete. Thus, the use of the emergency 911 feature inhibits the use of other features. Inhibition is only one kind of feature interaction; there are several others. Another example of a feature interaction involves the "distinctive alerting" feature which provides a distinctive ringing pattern based upon the identity of the calling party. If the customer's line is idle, the distinctive alerting feature is invoked automatically. However, if the customer's line is busy, the distinctive alerting feature is invoked only if another feature that can handle multiple calls has been invoked. Thus, the status or availability of other features has an effect on the distinctive alerting feature.

In the prior art, feature interactions are managed within the software that implements the feature. In the emergency 911 example above, feature management includes the actions necessary to inhibit the call waiting feature until the emergency 911 call is complete. The features, as well as feature-specific software for managing the interactions between features, are part of a single integrated switch control software package for the switch. Modification of that software can be done only by the original vendor.

The addition of a new feature that interacts with one or more previously existing features generally requires that the existing features be modified. Changes in one of the existing features may in turn fierce changes in other existing features. This cascade of modifications results in the need for extensive testing after the addition of the new feature. The new feature must be tested, all of the modified features must be tested, and the package as a whole must be tested. All of this testing is done in the context of the switch control software package that typically contains millions of lines of code. The total time involved in testing may be several years, and cost millions of dollars.

The principal advantage with providing an integrated software package that implements and controls both the features themselves and the interactions between the features is the speed at which the software package can run. However, with the advent of extremely fast processors and parallel processing techniques, the software speed advantage no longer absolutely outweighs the difficulty of modifying or introducing new features. The present invention separates the features from the interactions between the features by providing a separate apparatus that handles the feature interactions. This provides significant advantages, including easier modification of existing features and the introduction of new features. Thus, new features can be added to a telephone network more quickly and at lower costs than with current approaches.

SUMMARY OF THE INVENTION

A feature manager that handles the interactions between features is disclosed. The presence of the feature manager allows independent implementation of individual features via feature modules, without knowledge of the internal structure of other feature modules. The feature modules are self-contained software routines, each of which can provide instructions for manipulating basic call processing resources in a telephone network so as to implement a feature. Adding a new feature to an existing collection of features consists of: (1) adding a feature module that implements the feature, and (2) adding new "rules" to the feature manager. These rules specify how interactions between the feature modules are to be handled.

A telephone network incorporating the present invention includes a plurality of switches, each switch including a basic call processor. The basic call processor is typically a combination of hardware and software that generates a sequence of event messages in response to user actions. The event messages are transmitted to the feature manager sequentially. The event messages are then transmitted from the feature manager to a subset of feature modules for processing. The feature modules, following receipt of an event message, each formulate a response message that is returned to the feature manager. The response messages contain information that instructs the basic call processor to act. Additionally, the information contained within the response message is utilized to determine what other feature modules, if any, must be polled.

The feature manager formulates a call processor response from the response messages received and forwards the call processor response to the basic call processor. The call processor response includes information that instructs the basic call processor to act accordingly. Thus, the feature manager controls the interaction between features by controlling the distribution of event messages to feature modules and by formulating an appropriate call processor response that is returned to the basic call processor.

In accordance with other aspects of the present invention, for each call, the feature manager generates a virtual machine. The virtual machine responds to event messages by executing a sequence of instructions. When the virtual machine receives an event message, it executes a predetermined sequence of virtual machine instructions. These instructions, along with information contained in response messages previously received, result in the virtual machine relaying the event message to the subset of feature modules, collecting responses from those feature modules, synthesizing a proper call processor response, and forwarding the call processor response to the basic call processor.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 5A and 5B are a flow diagram of one sequence of instructions formed in accordance with the present invention.

DETAILED DESCRIPTION OF THE PREFERRED EMBODIMENT

Figure 1:
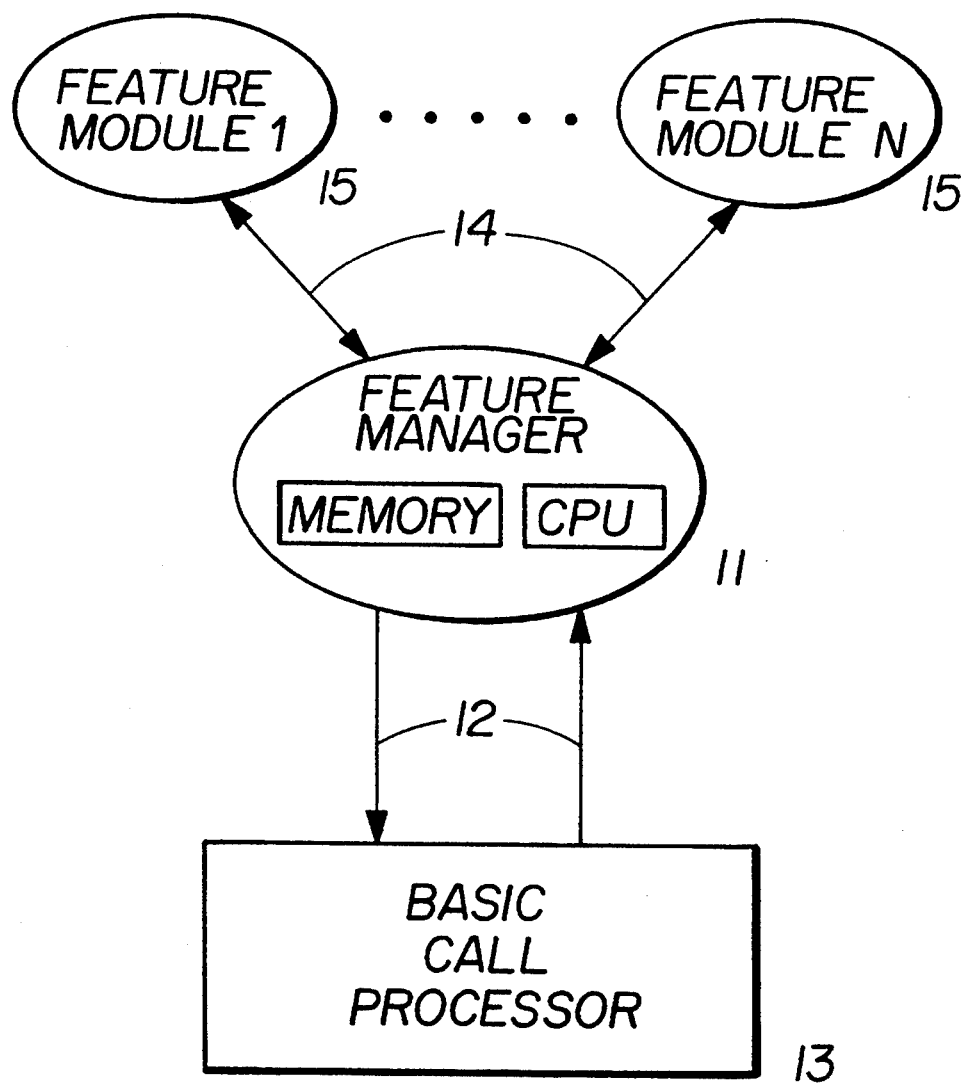
FIG. 1 is a block diagram of the relationships between the basic call processor, the feature manager, and a collection of feature modules in accordance with the present invention.

The relationships between the components of the present invention are illustrated in FIG. 1. The present invention includes a feature manager 11, a plurality of feature modules 15, bidirectional data interfaces 12 and 14, and a basic call processor 13. As can be seen, the basic call processor 13 is connected to the feature manager 11 by bidirectional data interface 12. The interface 12 allows the passing of event messages to the feature manager 11 from basic call processor 13 and a call processor response from the feature manager 11 to basic call processor 13. Basic call processor 13 is implemented in a switching system of a telephone network and the structure and operation thereof is well known in the art.

The feature manager 11 may be implemented within a switch in a telephone system, in which case the interface 12 is internal to that switch. Alternatively, the feature manager 11 may be implemented separate from the switch, in which case the interface 12 must be a physically external interface connecting the basic call processor 13 and the feature manager 11. The feature manager 11 includes memory and a central processing unit. As will be discussed in greater detail below, the feature manager 11 includes a memory that is used to store a sequence of instructions that control the operation of the feature manager 11. Moreover, the memory and central processing unit work in conjunction to form virtual machines as needed to process calls.

Basic call processor 13 translates physical action initiated by the telephone customer into a plurality of event messages for use by the feature manager 11. The basic call processor 13 thus performs or controls all of the basic processing functions needed to complete a network process. For example, telephone customers typically indicate a desire to initiate service by the physical action of closing a switch contact, i.e., picking up a telephone receiver. Basic call processor 13 translates that physical action into a series of event messages, the first of which is, in one actual basic call processor 13, an ORIGINATE event message. The ORIGINATE event message is then sent from the basic call processor 13 to the feature manager 11. As the call is processed, other types of event messages may be sent to the feature manager, dependent upon the desired action requested by the user. The set of possible event messages sent by basic call processor 13 to the feature manager is finite. Operation of the basic call processor 13 is not of primary concern and for further information, the reader is directed to the publication entitled *Rapid Service Delivery VO Call Processing Requirements, AT-RSD*-4300-10-002-02, US West Advanced Technologies (1991).

Actions initiated by a telephone user or telephone customer will typically result in basic call processor 13 sending one or more event messages to the feature manager 11. The feature manager 11 receives each of these event messages sequentially and formulates a call processor response to be forwarded to basic call processor 13. The call processor response is formed after the appropriate feature modules 15 have been invoked. Invocation of a feature module 15 involves sending a copy of the event message to a specific feature module 15 and receiving a response message from that feature module 15. Feature modules 15 are separate entities, typically implemented as software routines, that communicate with and respond only to the feature manager 11 via the bidirectional data interface 14. The actual implementation of the feature modules 15 is well known in the art and, in the preferred embodiment, is extracted from current switch control software packages.

Figure 2:
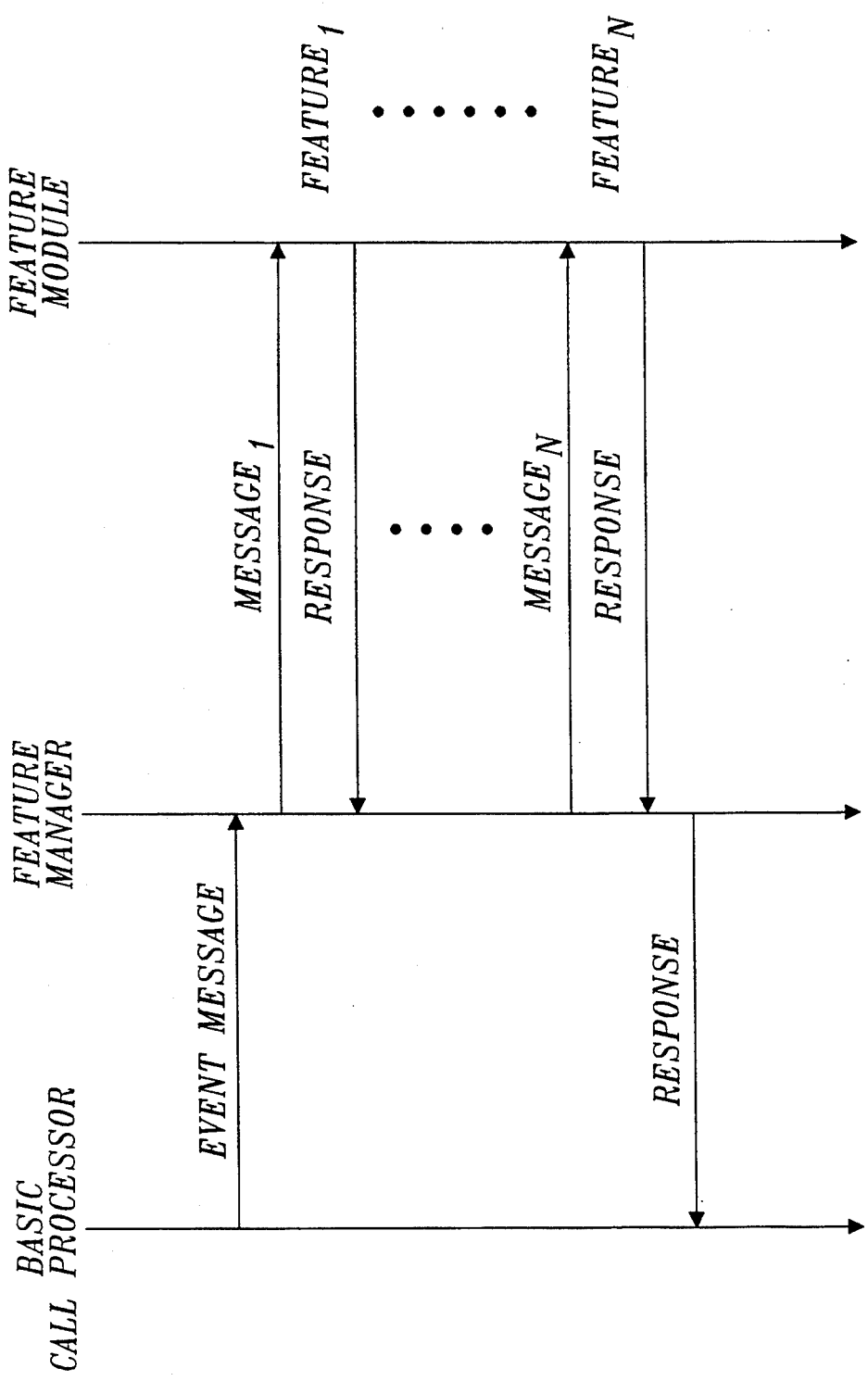
FIG. 2 is a diagram of the communications that occur between the components shown in FIG. 1 for processing an event message.

FIG. 2 illustrates the time-ordered sequence of communications that occur between the basic call processor 13, feature manager 11, and feature modules 15 in processing an event message. Time is shown on the vertical axis increasing from top to bottom. First, basic call processor 13 transmits an event message to the feature manager 11. The event message contains "context information" that enables the feature manager 11 and the feature modules 15 to correctly process the event message. Context information includes the following parameters: (1) event type, (2) user ID, (3) call ID, and (4) call state. The event type indicates the type of event message. An example of an event type is the ORIGINATE event message that occurs when a telephone customer picks up a telephone to make a call. The user ID parameter indicates the user that the event message is directed towards. If a user is engaged in multiple calls, the call ID parameter indicates the specific call that the event message is directed towards. Finally, the call state parameter indicates the current position of the call in a call process. Examples of the call state parameter include COLLECTING INFO, SELECTING FAC, and SELECTING RT. Each of the parameters above are well known in the art and for further information, the reader is directed to the publication entitled *Rapid*

*Service Delivery VO Call Processing Requirements, AT-RSD*-4300-10-002-02, US West Advanced Technologies (1991).

In order to facilitate processing of event messages, feature manager 11 constructs a virtual machine for each and every call that it handles. Thus, every instance a call is initiated by a telephone customer in the PSTN, a virtual machine is constructed to handle the telephone call. As is known in the art, a virtual machine is a means for performing a function via software. In the present invention, the virtual machine is operative to receive event messages from the basic call processor 13 and coordinate the communications with the feature modules.

Upon receipt of a first event message for a call, feature manager 11 constructs the virtual machine. An event message can be identified as a first event message by examining the event type of the event message. For example, in one actual embodiment of the present invention, if the event type is ORIGINATE, the event message is always a first event message and all other event types are not defined to be a first event message. When a first event message is received, a virtual machine is constructed and is maintained until the call is completed. The virtual machine is henceforth uniquely identified by the user ID and call ID parameters present in the first event message. Subsequent event messages transmitted by basic call processor 13 relating to the call are routed by the feature manager 11 to the uniquely identified virtual machine, based upon the user ID and call ID parameters contained in the subsequent event messages.

Figure 3:
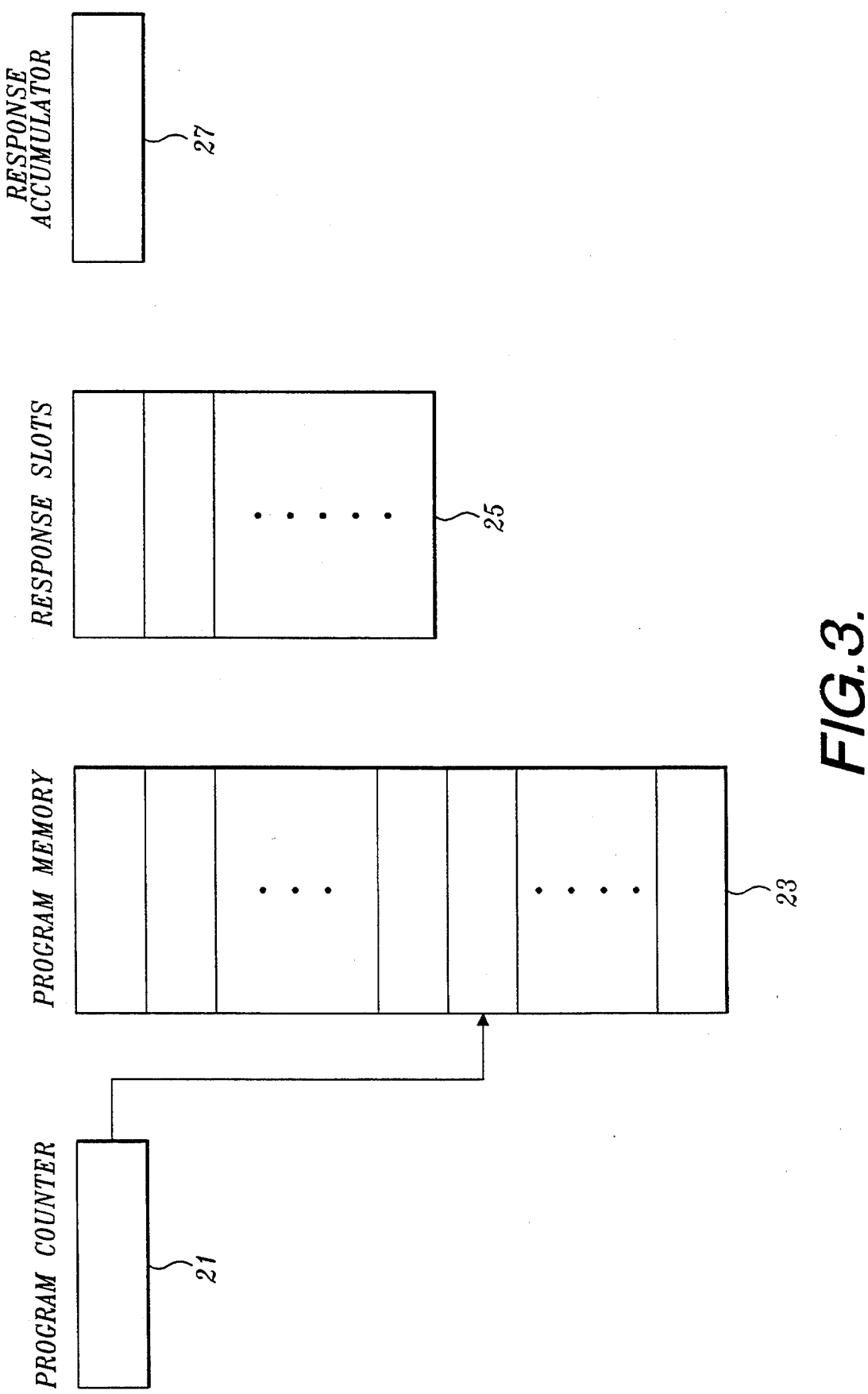
FIG. 3 is a block diagram of a virtual machine as implemented within a feature manager.

Referring to FIG. 3, the structure of the virtual machine constructed by the feature manager is shown. Each virtual machine consists of a program counter 21, a program memory 23, a plurality of response slots 25, and a call processor response accumulator 27. The response accumulator 27, response slots 25, and program counter 21 are all located in the memory of the feature manager 11. Thus, the construction of a virtual machine by feature manager 11 primarily involves the allocation of memory space from the memory by a central processor unit that is included within the feature manager. The program memory 23 contains a sequence of instructions that the virtual machine executes. Each instruction stored in the program memory has an instruction memory address. It can be appreciated that in order for the virtual machine to execute the sequence of instructions stored in program memory 23, the virtual machine utilizes the microprocessor of the feature manager.

The instruction memory address identifies the location of a particular instruction. The instructions as a whole specify the correct feature interactions for all of the feature modules being managed by the feature manager. Thus, it is the program memory 23 that stores the rules that govern how each feature in the feature package interacts with one another. Each and every virtual machine has the same sequence of instructions in its program memory 23. As additional features are added to the collection of feature modules 15 managed by the feature manager, the sequence of instructions that is stored in the program memory 23 must be modified. Similarly, if a feature currently offered on the telephone network is to be modified such that the interactions with other feature modules in the telephone network are changed, the instructions in the program memory 23 must be modified.

Analysis of feature interactions for a set of features indicates that the large majority of feature interactions can be properly managed by a correctly programmed sequence of instructions executed by the virtual machines. By having all of the feature interaction rules located in the feature manager, it can be appreciated that modification is considerably simpler than the current practice of modifying various portions of code in the feature modules themselves. Moreover, the number of instructions necessary to control all of the feature interactions within a set of features is comparatively small. Specifically, an actual simulation utilizing a set of 17 feature modules required a sequence of approximately 300 total instructions. Further investigation revealed that adding additional features resulted in a linear increase in the size of the sequence of instructions.

With respect to the other portions of the virtual machine, the program counter 21 stores an instruction memory address of the program memory 23. In particular, the program counter 21 acts as a pointer that indicates the location of a specific instruction in the program memory 23. Thus, by controlling the contents of the program counter 21, specific instructions may be executed by the central processor unit of the feature manager 11. The response slots 25 are memory slots that are used to store portions of the response messages returned from the feature modules 15 that are invoked. Specifically, the response slots 25 store a response type parameter included in each response message. Finally, the response accumulator 27 is a memory slot that stores the call processor response to be returned to basic call processor 13. As the response messages are returned from the subset of feature modules invoked, the response accumulator integrates each response message into the call processor response.

The individual instructions that form the sequence of instructions stored in program memory 23 each perform different actions. In one actual embodiment, there are seven types of instructions. The seven types of instructions are branch (B), branch on feature active (BFA), branch on feature not active (BFNA), branch on response equal (BRE), branch on response not equal (BRNE), call (CALL), and return (RET). These instructions enable the feature manager to send an event message to a feature module and collect its response message, to return the call processor response to the switch, to make unconditional branches, and to make conditional branches based upon the results of simple tests. It can be appreciated that these instructions are low level assembly language instructions that are executed by the CPU of feature manager 11 in accordance with standard procedures known in the art. Each of these instructions will be described below.

The first instruction is branch (B). The branch instruction, instructs the virtual machine to branch to an instruction memory address where another instruction is stored. This involves setting the program counter 21 to the appropriate instruction memory address. The branch instruction has one operand, the branch-to instruction memory address.

The second instruction is the branch on feature active (BFA). This is a conditional branch. If the specified feature module is considered active (described more fully below), then the branch is taken. The third instruction is branch on feature not active (BFNA). This is also a conditional branch. If the specified feature module is not active then the branch is taken. Both the BFA and BFNA instruction types have two operands. The first operand is the feature module that is tested for active status and the second operand is the branch-to instruction memory address.

The fourth instruction is branch on response equal (BRE). This is a conditional branch. If the response type stored in a specified response slot is equal to a type specified as an operand, then the branch is taken. The fifth instruction type is the branch on response not equal (BRNE). This is also a conditional branch. If the response type stored in a specified response slot is not equal to a type specified as an operand, then the branch is taken. Both the BNE and BRNE instructions have three operands. The first operand is a response slot, the second operand is a response type to be compared, and the third operand is the branch-to instruction memory address.

The sixth instruction is call (CALL). The call instruction sends the event message to a feature module and collects a response message from that feature module. The CALL instruction has one operand, the name of the called feature module. Finally, the seventh instruction type is return (RET). The return instruction returns the call processor response stored in the response accumulator 27 to basic call processor 13. The RET instruction does not have any operands.

Returning to FIG. 2, feature manager 11 relays the received event message to the appropriate virtual machine based upon the user ID and call ID parameters. The virtual machine executes the instructions stored in program memory 23. The instructions typically call for the routing of the event message to certain feature modules 15. For example, if the virtual machine executes the instruction CALL, as noted above, the event message is sent to the identified feature module and a response message is received therefrom. Moreover, it is likely that several feature modules 15 will be called by the virtual machine. The particular feature modules 15 that are called is dependent upon the contents of the response messages received from previously-called feature modules 15. Each of the feature modules 15 that is called provides a response message. Moreover, the response message from the first feature module 15 called must be collected before the second feature module 15 may be called. Once all of the feature modules 15 have responded, the virtual machine executes the RET instruction which returns the call processor response to basic call processor 13.

Each response message from any feature module 15 contains certain basic parameters in addition to specific dam to be returned to the basic call processor 13. Specifically, each response message has a response type parameter, a next event list, and additional parameters that are necessary for basic call processor 13 to continue with low level call processing. Examples of response type parameters include: COLLECT INFO, SELECT RT, and CONTINUE. Typically, the response type parameter indicates the action that basic call processor 13 should take. The additional parameters returned in the response message are typically values that basic call processor 13 requires in order to carry out the next action. Finally, the next event list indicates to the virtual machine which event messages the particular feature module 15 will be active for. As noted above, two of the branching instructions that are stored in program memory 23 are BFA and BFNA which require a check of feature modules 15 to determine whether or not they are active. The next event list supplies such information. In particular, a first feature module may return a next event list that indicates that for certain event messages having a specified event type, that feature module 15 shall be considered active. For all other event messages having different event types, the feature module 15 will be considered inactive. For a particular call (and thus, for a particular virtual machine), each feature module is considered active or inactive based upon the most recently returned next event list from the feature module.

Figure 4:
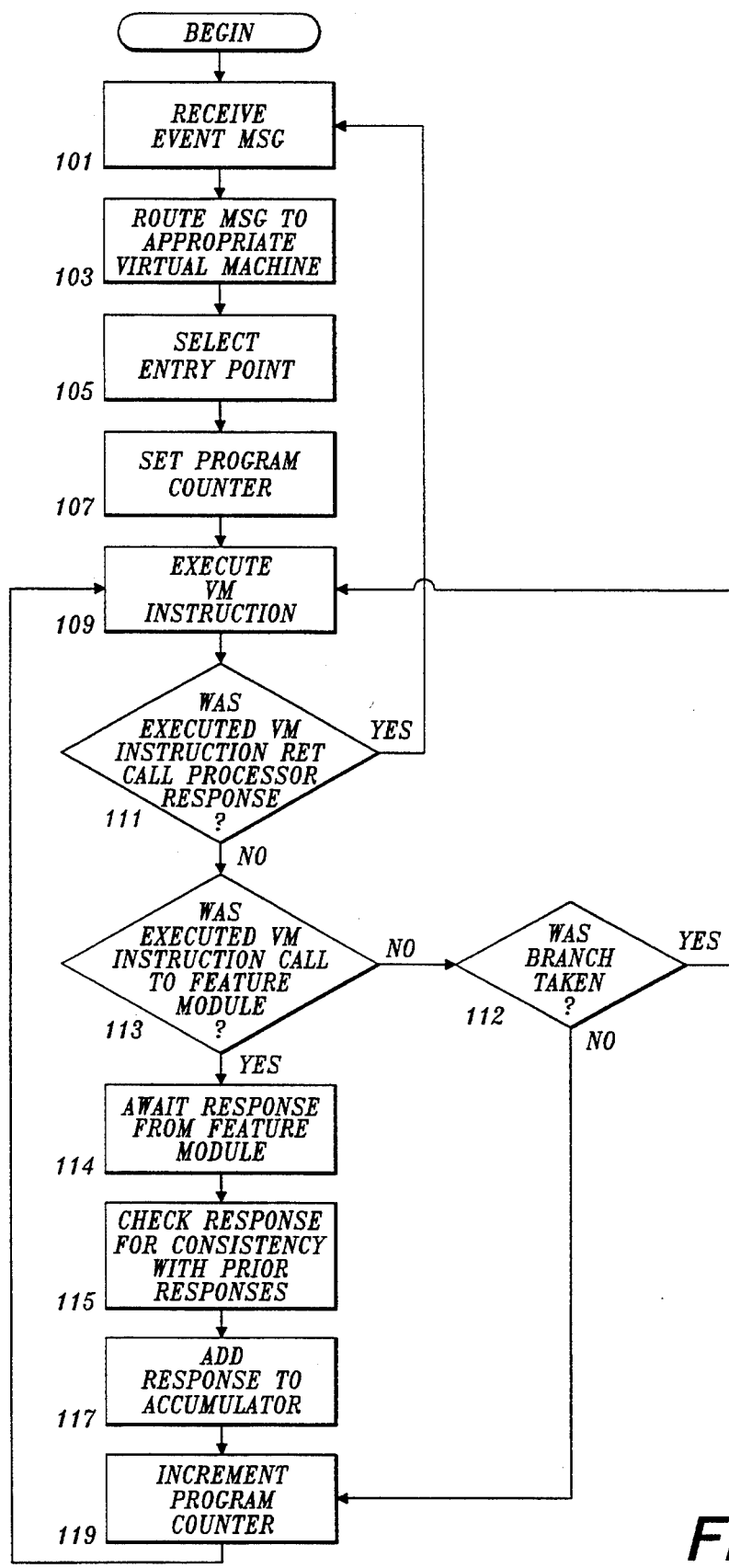
FIG. 4 is a flow diagram illustrating the operation of a feature manager.

The operation of a typical virtual machine in response to an event message is illustrated in FIG. 4. In general, the virtual machine monitors the bidirectional interface 12 for event messages from basic call processor 13. If an event message is detected, at a box 101, the virtual machine receives the event message transmitted on interface 12. As noted earlier, each event message sent by the basic call processor contains an user ID and a call ID parameter that allows the feature manager 11 to route the event message to the appropriate virtual machine. Thus, at a box 103, based upon the user ID and call ID parameters, the feature manager 11 routes the event message to the virtual machine corresponding to the user ID and call ID parameters. However, if the event message is a first event message, then the feature manager constructs a new virtual machine for the user ID and call ID parameters.

After the appropriate virtual machine receives the event message, at a box 105, the virtual machine selects an initial value for program counter 23 as the entry point into the sequence of instructions. The selection of the entry point is based upon the event type and the call state parameter contained in the event message. In one embodiment, selection of an initial value for the program counter 21 is done using a simple look-up table. Because there are a finite number of event types and a finite number of call states, there are a finite number of possible permutations. For each possible combination of event type and call state, there is a predetermined initial value. It can be appreciated by those skilled in the art that implementation of a two-variable look-up table is known. At a box 107, the program counter of the virtual machine is set to the entry point.

Next, at a box 109, the virtual machine executes the instruction stored in the instruction memory address contained in the program counter 21. As noted earlier, the instructions contained in program memory 23 can be one of seven types, B, BFA, BFNA, BRE, BRNE, RET, and CALL. Next, at a box 111, a check is made to see if the executed instruction was a RET instruction. An executed RET instruction indicates that the virtual machine has finished processing the event message and has returned a call processor response to basic call processor 13. If a RET instruction was executed, the feature manager 11 resumes monitoring the bidirectional interface 12 for the next event message at box 101.

If the executed instruction was not RET, the virtual machine goes to a box 113. At box 113, a check is made to determine whether the executed instruction was a CALL instruction. The CALL instruction invokes a feature module 15. If the executed instruction was not CALL, then the executed instruction must have been a branching instruction (B, BFA, BFNA, BRE, or BRNE). Depending upon the branching instruction, a branch may have been taken or may not have been taken. For example, if the executed instruction were a B instruction, the branch is always taken. However, if the executed instruction were a BFA instruction, then the branch may or may not be taken depending upon the active/inactive status of a feature module. Thus, if at a box 112, the instruction causes a branch, the branch is taken and the virtual machine returns to box 109. However, if the instruction does not cause a branch, the virtual machine goes to a box 119 where the program counter is incremented to the memory address of the next instruction in the sequence of instructions. Next, the virtual machine returns to box 109 and the next instruction in the sequence of instructions is executed.

If at box 113, the executed instruction was CALL, the virtual machine at a box 114 awaits for the response message from the called feature module. When the response message is received, at a box 115, the response message is checked for consistency with a call processor response stored in the call processor response accumulator 27. The call processor response, as will be seen below, is a compilation of response messages from the feature modules that had been previously called as a consequence of the event message. If the response message received is from the first feature module called, the step of checking for consistency is omitted. However, for every response message received from subsequently called feature modules, the response message is checked for consistency.

A response message can be inconsistent with the call processor response in the response accumulator 27 in one of three cases. First, the call processor response and the received response message can be of two different response types. Next, the responses may be of the same response type, but other parameters associated with that response type may be different non-nil values. Finally, if the responses attempt to set two different but mutually exclusive parameters to non-nil values, then the responses are inconsistent.

For example, if the call processor response stored in response accumulator 27 has a response type COLLECT INFO and a response message from a feature module has a response type SELECT RT, then the response types are inconsistent. In one actual embodiment, one exception to having the response types of two responses identical is a response message having the response type CONTINUE. Thus, if the call processor response has a response type COLLECT INFO and a response from a feature module has a response type CONTINUE, then the response types are considered consistent. The CONTINUE response type indicates that the feature module called is abstaining from call processing on this particular event message. Thus, the CONTINUE response type allows a feature module to return a response message that does not require any action by the basic call processor 13 and yet maintain consistency with prior responses.

As an example of the second type of inconsistency, if (1) the response type of the call processor response and the response type of a polled feature module are both ANALYZE INFO and (2) the call processor response has a data parameter that is "5551234" and the polled feature module returns the same data parameter as "9302545", then the response message from the polled feature module is inconsistent with the call processor response.

Finally, as an example of the third type of inconsistency, if (1) the response message from a polled feature module returns a non-nil value for a first data parameter, (2) the call processor response stored in accumulator 27 has a non-nil value for a second data parameter, and (3) the two data parameters are mutually exclusive, then the response message from the polled feature module is inconsistent with the call processor response. If any of the inconsistencies described above occur, the virtual machine will discard the message and log an error message to be returned to basic call processor 13.

If a response message is consistent with the call processor response stored in the call processor response accumulator 27, at a box 117, the received response message is integrated with the call processor response in the response accumulator 27. As noted above, in order for the received response message to be consistent with the call processor response, the response types of both must be the same. In one actual embodiment, there is one exception. If the call processor response type is CONTINUE, then any received response message having any response type will be considered consistent. In such a case, the call processor response will assume the response type of the received response message.

The integration of the received response message to the call processor response involves adding each of the parameters returned in the response message to the existing call processor response. For example, assume a first feature module polled by a virtual machine returns a response message of response type OFFER CALL, and the response message includes no other parameters. Next, if a second feature module polled returns a response message of response type OFFER CALL and includes other parameters, the other parameters are added to the call processor response.

Moreover, the current next event list is replaced by the next event list returned in the response message. As noted earlier, the next event list indicates to the appropriate virtual machine which future event messages the virtual machine should route to the feature module. For example, if a feature module returns a response having a next event list including ROUTE SELECT, DISCONNECT, and CALL TERMINATE, upon receipt of event messages of such event type, the virtual machine would classify the feature module as active. For all other event messages having different event types, the virtual machine would classify the feature module as inactive. The next event list dam structure keeps track of each feature such that when a particular event occurs, the virtual machine can quickly determine whether or not a feature is active for that particular event. In this manner, the virtual machine may branch dependent upon the active or inactive status of a feature.

Finally, at a box 119, the program counter is incremented such that execution of the next instruction in the sequence of instructions may continue. The virtual machine then returns to box 109 and the next instruction is executed. The process of executing instructions is continues until the event message is processed and a call processor response is returned to the basic call processor.

As an example of a short set of instructions stored in the program memory 23, a sequence of instructions for a feature package consisting of a single feature (called "FEATA") that responds to a single event consists of two instructions:

| call | FEATA, SLOT1 |
| --- | --- |
| ret | |

The first instruction calls FEATA and places the response therefrom in SLOT1 of the response slots 25. The second instruction returns the call processor response to the basic call processor 13. Clearly telephone networks with more features require more complex combinations of instructions. For example:

```
          call   FEATA, SLOT1
          brne   SLOT1, R_CONTINUE, L2
          bfna   FEATB, L1
          call   FEATB, SLOT1
          b      L2
L1:
          call   FEATC, SLOT1
L2:
          ret
```

This sequence of instructions calls FEATA and processes the response. If the response type is not R CONTINUE, the branch is taken to L2 and the contents of the accumulator is returned to the adjunct call processing manager. A response of type R CONTINUE indicates that the sequence of instructions should next request a response from FEATB. If the response from FEATA is R CONTINUE, FEATB is tested fro active status. If FEATB is active, FEATB is called and the contents of the response accumulator is returned. If FEATB is not active, a branch is taken to L1 and FEATC is called and the contents of the response accumulator is returned to the basic call processor. When either FEATB or FEAATC is called, the response type overwrites the response type from FEATA that had been previously stored in the slot referenced by SLOT1. Each time a new feature is added, the sequence of instructions that represents the feature interactions of the package must be rewritten.

In one actual sequence of instructions written for simulation purposes, the interactions for a set of 17 features were managed. The portion of the sequence of instructions that handles the CALL PRESENT event message is shown below. The CALL PRESENT event message marks the beginning of call processing at the terminating portion of a call and typically follows the ORIGINATE event message. CALL PRESENT is a type of event message, and as noted earlier, the event type and state of the call determines the entry point into the program. Thus, shown below is only a portion of the sequence of instructions stored in program memory 23:

```
          bfna   E911, L0
          call   CF, SLOT1
          bre    SLOT1, FORWARD-CALL, L3
          call   CFB, SLOT1
          bre    SLOT1, FORWARD-CALL, L3
          call   E911, SLOT1
          ret    SLOT1
L0:
          call   ORIDE, SLOT1
          bre    SLOT1, OFFER-CALL, L3
          call   BARGE, SLOT1
          bre    SLOT1, OFFER-CALL, L3
          bre    SLOT1, MERGE-CALL, L3
          call   PICKUP, SLOT1
          bre    SLOT1, DISCONNECT, L3
          bre    SLOT1, MERGE-CALL, L3
          call   TSCREEN, SLOT1
          bre    SLOT1, DISCONNECT, L3
L1:
          call   CF, SLOT1
          bre    SLOT1, FORWARD-CALL, L3
          call   CFB, SLOT1
          bre    SLOT1, FORWARD-CALL, L3
          call   VANILLA, SLOT1
          bre    SLOT1, OFFER-CALL, L2
          b      L4
L2:
```

-continued
```
          call   CFDA, SLOT2
          call   TR, SLOT2
          call   DR, SLOT2
          bre    SLOT2, OFFER-CALL, L4
L3:
          ret    SLOT1
L4:
          ret    SLOT2
```

Figure 5A:
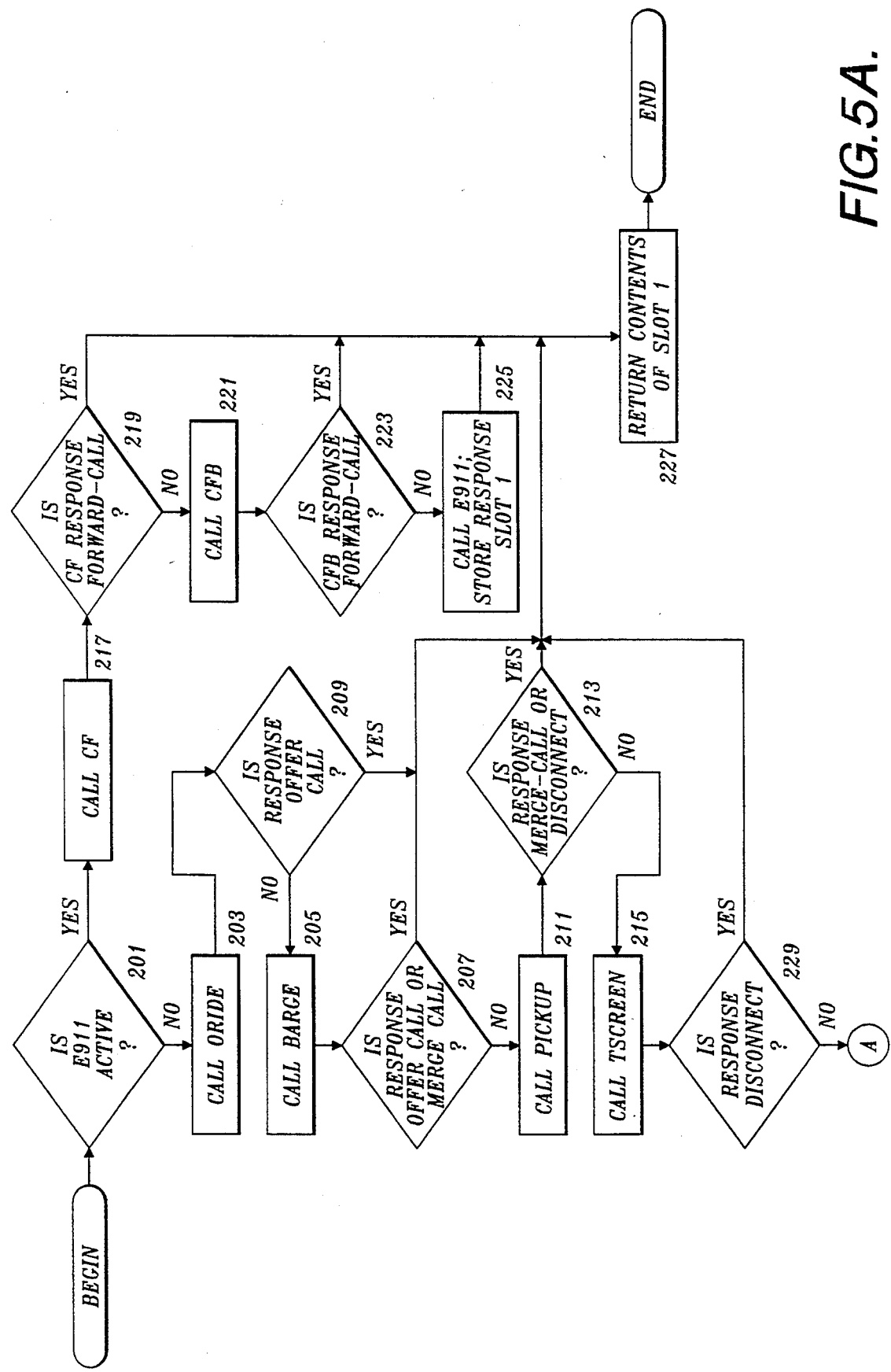

Like most programs written in assembly level language, the overall flow of actions is not clear upon casual inspection. FIGS. 5A and 5B illustrate in flow chart form the sequence of instructions. The first seven instructions involve the interactions between the emergency 911 feature and the rest of the features in the package. The first instruction is a branch on feature not active shown at box 201. If emergency 911 is not active, then the program should branch directly to address L0. However, if the feature is active, then the program sequence bypasses the bulk of the program and calls only the CF, CFB, and E911 features (shown diagrammatically in boxes 217-225). Thus, in this manner the emergency 911 feature disables all other features and conflicts between features are avoided.

Four features, ORIDE, BARGE, PICKUP, and TSCREEN are called sequentially for a response (shown diagrammatically at boxes 211-215). If the response matches a predetermined response type, then the branch is taken. The next two features VDP and CWC (shown diagrammatically in boxes 231-237) exist for the purpose of defeating the call waiting feature CW. If either responds with DISCONNECT, the call waiting feature CW (boxes 239-241) is skipped. Assuming that it is called, the CW feature may respond with either OFFER CALL or DISCONNECT. If the response is OFFER CALL, the decision as to what to do with the call has been made. If the response is DISCONNECT, there are further options to consider. In this manner, the remaining features (boxes 243-267) can be slectively polled to determine a proper call processor response to be returned to the basic call processor 13.

In the manner shown in the example above, different feature interactions can be managed by merely formulating a set of interaction rules and producing a sequence of instructions that implement the rules. The sequence of instructions are not modified unless a new feature is added or an existing feature modified. The utilization of a "block structured" organization approach to features and the feature manager obviates labor intensive modification of the switch control software packages.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A feature manager for managing the interactions between a plurality of features in a telephone network, each of said plurality of features implemented by a corresponding feature module, each feature module including control logic for responding to an event message, said feature manager adapted for receiving said event message and, said event message provided by a basic call processor that generates said event message in response to user and network actions, said feature manager comprising:

means for receiving said event message;

means for transmitting said event message to said feature modules;

means for receiving response messages from said feature modules;

means for transmitting a call processor response to said basic call processor;

a memory;

a microprocessor for controlling the transmission and reception of said event message, said response messages, and said call processor response, said microprocessor operating in accordance with a predetermined sequence of instructions stored in said memory, said predetermined sequence of instructions operative to poll selective feature modules; and wherein each of said selective feature modules are sequentially polled by transmitting said event message to each of said selective feature modules, said selective feature modules processing said event message, formulating said response messages and returning said response messages, and further wherein said response messages that are received from said selective feature modules are compiled into said call processor response and said call processor response is transmitted to said basic call processor.

2. The apparatus of claim 1 wherein said event message includes an event type and a call state, wherein an entry point is determined from said event type and said call state, said microprocessor using said entry point to determine a starting instruction in said predetermined sequence of instructions in which to begin execution of said predetermined sequence of instructions.

3. The apparatus of claim 1 wherein said response messages from said selective ones of said plurality of feature modules are checked for consistency with one another.

4. The apparatus of claim 1 wherein said microprocessor transmits said event message to said selective ones of said plurality of feature modules in a sequential manner such that said response message from a first feature module is received prior to transmitting said event message to a subsequent selective one of said plurality of feature modules.

5. The apparatus of claim 4 wherein said selective ones are determined by the response message of previously polled feature modules and based upon said predetermined sequence of instructions.

6. The apparatus of claim 1 wherein said microprocessor constructs a virtual machine resident in said memory for each call handled by said feature manager, said virtual machine identified by a virtual machine user ID and a virtual machine call ID, further wherein said event message includes an user ID and a call ID parameter such that said microprocessor routes said event message to said virtual machine having a virtual machine user ID and a virtual machine call ID corresponding with said user ID and caller ID of said event message.

7. Am apparatus for providing a plurality of features to a telephone network having a basic call processor, said basic call processor formulating an event message in response to user actions, said apparatus comprising:

a plurality of feature modules, each of said feature modules implementing one of said plurality of features, each of said feature modules including control logic for responding to said event message; and a feature manager for receiving from said basic call processor said event message and managing interactions between said plurality of features, said feature manager comprising:

means for receiving said event message from said basic call processor;

means for transmitting said event message to said plurality feature of modules;

means for receiving response messages from said feature modules;

means for transmitting a call processor response to said basic call processor;

a memory;

a microprocessor for controlling the transmission and reception of said event message, said response messages, and said call processor response, said microprocessor operating in accordance with a predetermined sequence of instructions stored in said memory, said predetermined sequence of instructions operative to poll selective feature modules; and wherein each of said selective feature modules are sequentially polled by transmitting said event message to each of said selective feature modules, said selective feature modules processing said event message, formulating said response messages and returning said response messages, and further wherein said response messages that are received from said selective feature modules are compiled into said call processor response and said call processor response is transmitted to said basic call processor.

8. The apparatus of claim 7 wherein said event message includes an event type and a call state, wherein an entry point is determined from said event type and said call state, said microprocessor using said entry point to determine a starting instruction in said predetermined sequence of instructions in which to begin execution of said predetermined sequence of instructions.

9. The apparatus of claim 7 wherein said response messages from said selective ones of said plurality of feature modules are checked for consistency with one another.

10. The apparatus of claim 7 wherein said microprocessor transmits said event message to said selective ones of said plurality of feature modules in a sequential manner such that said response message from a first feature module is received prior to transmitting said event message to a subsequent selective one of said plurality of feature modules.

11. The apparatus of claim 10 wherein said selective ones are determined by the response message of previously polled feature modules and based upon said predetermined sequence of instructions.

12. The apparatus of claim 7 wherein said microprocessor constructs a virtual machine resident in said memory for each call handled by said feature manager, said virtual machine identified by a virtual machine user ID and a virtual machine call ID, further wherein said event message includes an user ID and a call ID parameter such that said microprocessor routes said event message to said virtual machine having a virtual machine user ID and a virtual machine call ID corresponding with said user ID and caller ID of said event message.

\* \* \* \* \*